Jan. 16, 1973     J. BALLARD     3,711,362
METHOD FOR FORMING WEDGE SHAPED EDGE
Filed Aug. 17, 1971     3 Sheets-Sheet 1
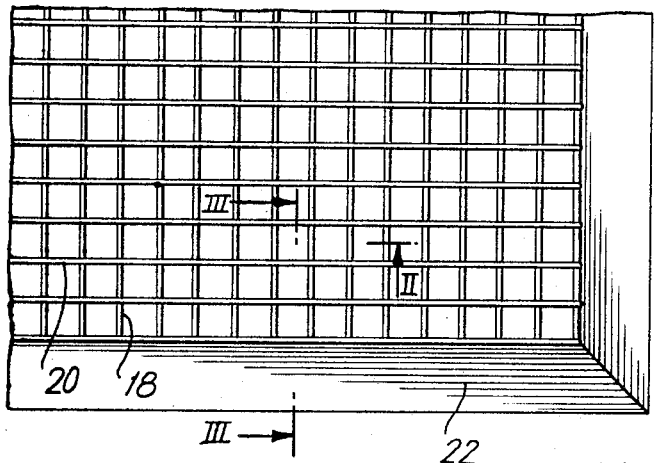
INVENTOR.
JULES BALLARD
BY
*Roberts and Cohen*
ATTORNEYS

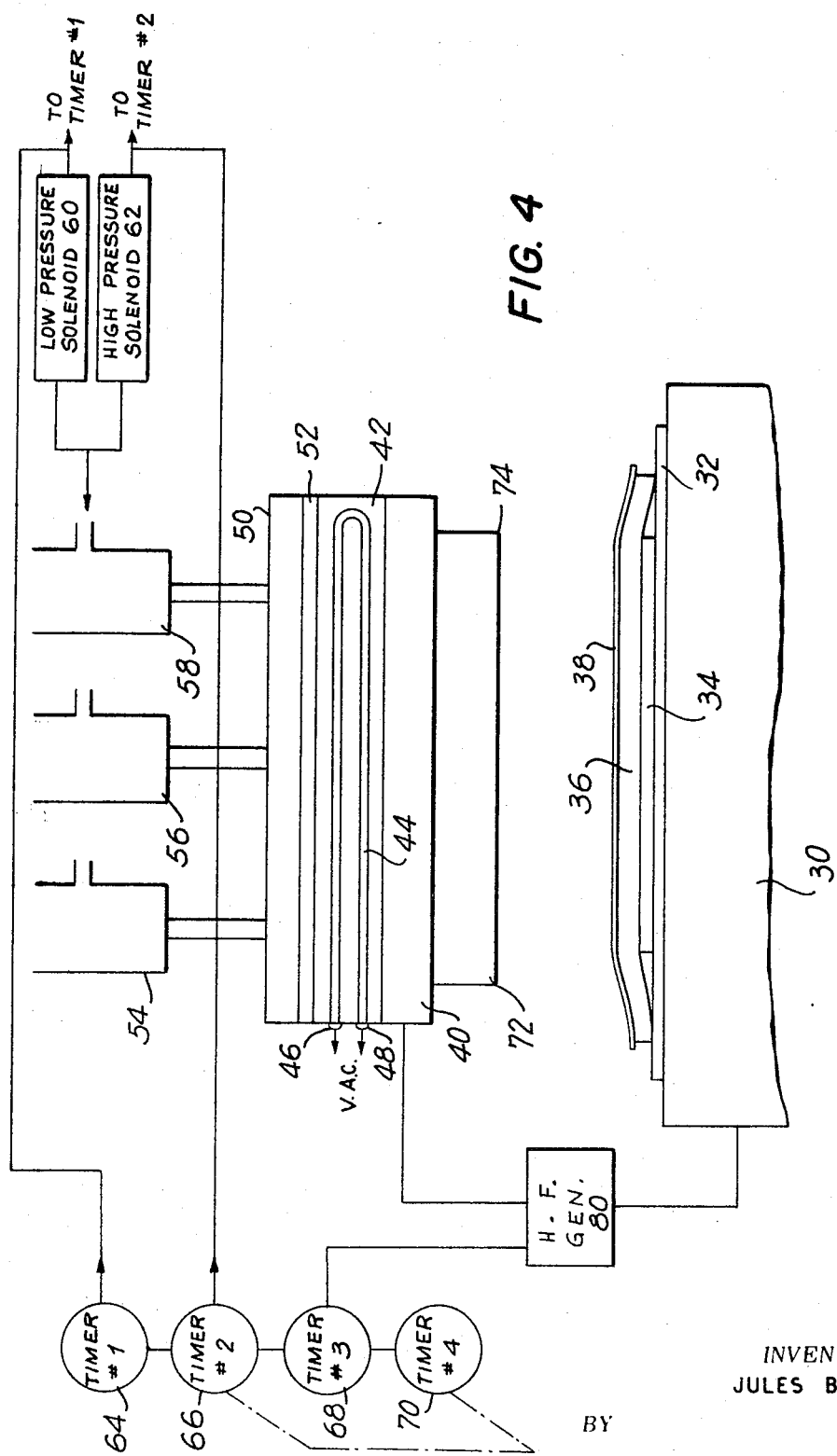

3,711,362
METHOD FOR FORMING WEDGE SHAPED EDGE
Jules Ballard, 262 Schley Place, Teaneck, N.J. 07666
Filed Aug. 17, 1971, Ser. No. 172,508
Int. Cl. B29c 27/04
U.S. Cl. 156—219     6 Claims

ABSTRACT OF THE DISCLOSURE

To make a mat of foam or sponge elastomer, a vinyl or thermoplastic film is superposed on a foam or sponge layer which is placed on a platen and a die is brought down against the same. The die is heated by means of an internal electrical resistance or steam or the like and causes the upper surface section of the foam or sponge layer to fuse and bond to the film. The die has edge portions capable of providing a wedge shaped peripheral edge on the resulting mat and a high frequency energy is passed through the resulting mat particularly at the peripheral edge thereof in order to control the shape or profile of the edge. The die is provided with channels or grooves capable of impressing ridges into the upper surface of the mat and use is made of these grooves to permit the evacuation of air from between the film and the sponge or foam layer by operating the die in sequential pressure stages in the first stage of which a relatively low pressure is employed.

BACKGROUND

Field of invention

This invention relates to laminated products such as floor mats, fatigue mats, and the like and to methods for making such products. The invention particularly relates to the production of products made from a cellular sponge thermoplastic elastomer or a foam which is fused to a film of solid unexpanded elastomer and simultaneously shaped and formed.

Prior art

In the manufacture of various articles, it would be desirable to have a thermoplastic film and a sponge or foam elastomer completely and integrally fused and combined at their interfaces to impart a decorative pattern to the surface, as well as a compound shape to the peripheral edges thereof, to form the surrounding edges and to eliminate a cutting and trimming operation and to perform all of these operations substantially simultaneously.

Heretofore, to manufacture a laminated article of the above noted type, there has been proposed the use of an autoclave press. A semi-fluid mixture of crumb-rubber aggregate or another type of elastomer particle and an adhesive or latex was metered into a form or mold onto an underlay of vinyl or other similar component. This combination was placed into the press and molded to a desired contour under appropriate conditions of heat and pressure for an extended cycle of, for example, 6 to 15 minutes. After removal from the press, the material had to be cooled and could then be cut to shape and size with a die which involved another type of press.

Other known types of operations similarly involved multiple operations and also involved other types of material as well. Furthermore, none of the known techniques involved the use of an all-vinyl sponge or the like combined with an unsupported or 100% vinyl film or the like. Furthermore, none of the known processes, including some of those which are designated as a laminating method, are techniques involving a true fusion of two such materials over the entire interface area thereof. In fact, on examination these processes are techniques involving a fusion of materials at specific points whereat the materials are in contact and compressed by a heat seal bar or the like. These fused areas remain permanently compressed since all of the air is squeezed out by a collapsing of the cell structure during the process and the areas surrounding and between the collapsed areas remain unlaminated and have air spaces between and separating their layers.

Other techniques involve the use of an adhesive or the reactivating of a previously applied low melting adhesive formulation. According to some techniques, crumb-rubber sponge and other crumb-elastomer aggregate materials are processed to form a so-called lamination. These starting materials result in a product which is susceptible of disintegrating or cracking when repeatedly folded or to crumbling due to oxidation and usage. They are also water-absorbent, which is an undesirable property for a fatigue or floor mat. They are susceptible to mildew and the absorbing of food odors. Furthermore, when in a wet condition, water is exuded from the same when stepped upon. They are furthermore difficult to wash and clean and cannot be dried by mechanical forces without weakening the structure or crumbling. Drying, therefore, requires an extended period of time, during which the product cannot be put into service.

A number of improved methods have been patented involving the use of a layer or film and a body of foam or sponge. One of the patented techniques is disclosed in U.S. Patent 3,026,233 (W. M. Scholl et al.), issued Mar. 20, 1962. In this patent is disclosed an electronic heat sealing method for polyurethane foam. A technique is described herein for forming the inner sole for a shoe and the technique is such that a thermoplastic film rests upon a polyurethane foam to which it is peripherally connected by the use of a high frequency electromagnetic energy. This technique differs from that of the present invention, as will be discussed hereinbelow.

Another novel technique is disclosed in U.S. Patent No. 3,163,687 (S. C. Einhorn), issued Dec. 29, 1964. In this patent is disclosed a method for molding elastic polymeric foams. In this technique intersecting channels are provided in a blow mold cover to control internal gas pressures and as a secondary phenomenon results in the underside of a product having intersecting ridges. However, as will be shown, the intersecting channels of the mold cover do not extend in such a manner as to permit the venting of air during the product-forming operation and this is a disadvantage as will be discussed hereinafter.

In U.S. Patent No. 3,499,848 (M. Weisman), issued Mar. 10, 1970, use is made of a high frequency generator, but the specific object of this patent is to provide a superior elastomer which accommodates the use of high frequency and in all other respects this invention differs from the present invention, as will be shown.

Examination has furthermore revealed a plethora of further patents relating to the production of foam products. These include, by way of example, U.S. Pat. 2,806,812 (E. H. Merz), issued Sept. 17, 1957; U.S.

Pat. 2,920,977 (B. F. Adams), issued Jan. 12, 1960; U.S. Pat. 2,962,406 (D. F. Rosa), issued Nov. 29, 1960; U.S. Pat. 3,001,899 (P. B. Hansen et al.), issued Sept. 26, 1961; U.S. Pat. 3,012,926 (G. E. Wintermute et al.), issued Dec. 12, 1961; U.S. Pat. 3,016,317 (E. Brunner), issued Jan. 9, 1962; U.S. Pat. 3,025,206 (W. M. Scholl), issued Mar. 13, 1962; and U.S. Pat. 3,170,832 (C. L. Wilson et al.), issued Feb. 23, 1965.

None of these patents, however, relates to the objects and techniques of the invention as will be disclosed hereinafter.

SUMMARY OF THE INVENTION

An object of the invention is to provide improved articles of manufacture made from foam or sponge elastomer and having a film of thermoplastic material laminated thereto in completely bonded face-to-face relationship.

A further object of the invention is to provide an improved method for fabricating articles of manufacture of the above-noted type.

Yet another object of the invention is to provide a new and useful lamination having unique properties resulting in high internal strength, uniformity of construction, exceptional resilience, closed cell structure, washability, excellent wearing properties, superior aging properties, and so forth.

Yet another object of the invention is to provide a new and improved lamination which is particularly suited for the making of fatigue and floor mats and other articles of this general type which were formerly made by molding and which required multiple-step manufacturing techniques.

Yet another object of the invention is to provide an improved article of manufacture as well as technique for making the same and specifically improved mats and the like which are resistant to fungus, rot, mildew and penetration by oils and greases or the like.

A further object of the invention is to provide an improved method of fusing, laminating, forming and shaping, as well as trimming to size in a single operation a vinyl film and a closed cell vinyl sponge or foam, as well as a similar combination of other thermoplastic elastomers in a single operation.

It is a further object of the invention to provide a technique for eliminating entrapped air from between the layers of a laminate such as an overlay and substrate to avoid the formation of air pockets during a laminating and/or hot forming process.

Still another object of the invention is to provide an improved technique which achieves the aforegoing objects while providing for the molding of a positive relief pattern in the top surface of a laminate article of manufacture so as to provide, for example, a slip-proof surface for both safety and decoration.

It is another object of the invention to provide an improved technique whereby the decorative vinyl skin and sponge vinyl substrate of an article will be internally fused and combined at their interface over their entire abutting surfaces. Fusion is employed in this technique in a manner which will not collapse the cell structure of the substrate adjacent the immediately contacting surfaces.

It is a further and important object of the invention to provide an improved method whereby the profile of peripheral edge of articles of manufacture can be controlled in a predictable manner.

Another object of the invention is to provide an improved structure for mats and the like in accordance with which the peripheral edges of such articles are turned down below the horizontal level of the bottom surface of the article.

In achieving the above and other objects of the invention, there is contemplated the use of a method which comprises heating a die by means of thermal conduction energy, bringing the thusly heated die against a thermoplastic film covering a sponge layer on a base platen to laminate the film and sponge layer and to define a wedge shaped peripheral edge for a film-sponge article and applying a high frequency electromagnetic energy to assist in the lamination of the film and sponge layer and to said peripheral edge to sever the article. The method further comprises selecting the profile of the edge by controlling the ratio of the thermal-conduction and high frequency energies.

In addition there is contemplated the use of a die provided with grooves to form ridges on the article and bringing the die against the film in at least two successive stages of relatively low and high pressures to evacuate air from between the film and sponge layer.

Preferably the film has a higher melting point than the sponge layer and the method comprises melting, to no more than a depth of about 2 millimeters, the sponge layer adjacent the film to bond to the latter.

In accordance with the invention, and as will be shown in greater detail hereinafter, the high frequency energy may be adjusted to turn down the peripheral edge of the thusly produced product. Moreover, as will be shown, the first of the stages is the low pressure stage and comprises the use of a pressure of from about 5 to 50 p.s.i.g., this stage lasting for about 0.5 to 5 seconds. The subsequent stage may be, for example, a stage which employs a pressure of from about 80 to 500 p.s.i.g.

The sponge which is employed may preferably be a vinyl sponge having a density of from 3 to 45 pounds per cubic foot and this sponge will have preferably a closed cell structure involving cells of from about 0.1 to 3 millimeters.

As will be seen in greater detail hereinafter, the sponge layer may be supported during the process on a pressure pad resting on a buffer on the platen. This pad may lie completely within the peripheral edge of the article being formed. The die may be provided with a knife-edge corresponding to the peripheral edge and operating in conjunction with the high frequency energy to sever the finished article from the laminate produced by the above technique.

As will be discussed hereinafter, an article of manufacture is formed which comprises a foam layer with a film covering the same in back-to-face relationship therewith. The foam layer includes a collapsed surface portion bonding the film to the foam layer over substantially the entire abutting faces thereof. The upper surface of the article is provided with intersecting ridges and the article is provided with a wedge shaped edge which is preferably turned down below the bottom surface of the main body of the article.

As will be seen, the ridges may be divided into intersecting or angularly related groups whereof the ridges of one group may be higher than the ridges of the other group. The ridges may moreover be straight, zig-zag, curved and so forth.

Other objects and features, as well as advantages, of the invention will become apparent hereinafter from the detailed description of the invention following hereinbelow as illustrated in the accompanying drawing.

BRIEF DESCRIPTION OF DRAWING

FIG. 1 is a fragmentary top plan view of an article of manufacture such as a floor mat provided in accordance with the invention;

FIG. 2 is a cross-sectional view of the article of FIG. 1 taken along line II—II;

FIG. 3 is a cross-sectional view taken along line III—III in FIG. 1;

FIG. 4 diagrammatically illustrates the apparatus of the invention employed for practicing the improved method thereof;

FIG. 5 is a perspective view of the top part of the die employed in the apparatus of FIG. 4, the die being inverted to expose the bottom face thereof;

DETAILED DESCRIPTION

Figure 6:
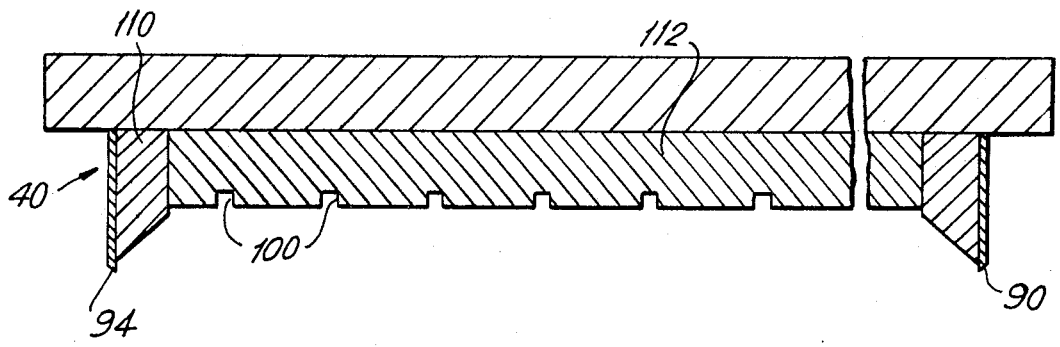
FIG. 6 shows a section through the die of FIG. 5.

As will be shown hereinafter, a thermoplastic elastomer (vinyl) sponge is positioned under a die upon a buffer material which is preferably a high grade of phenolic impregnated paper. An overlay of unsupported thermoplastic film, which may also be vinyl, is placed directly on top of the sponge. The vinyl sponge should have preferably a density of from about 3 to 45 pounds per cubic foot and should preferably have a closed cellular structure with the size of the cells preferably ranging from about .01 to 3 millimeters. An open cell structure may also be employed.

The overlay sheet can be of a cast vinyl liquid plastisol type or of a calendered vinyl type. In both instances, the melting point of the overlay material should be higher than the fusing point of the sponge which may range, for example, from about 225 to 375° F.

The forming die is such as to be thermally heated by means of conduction and by the use of a source such as an electrical resistance or steam or the like. It is brought into contact with a lamination package at a low pressure during a first stage ranging from about 5 to 50 p.s.i.g. This first stage is maintained until the entrapped air between the cover film and the sponge substrate has escaped through channels which are provided in the die and which are employed for purposes of forming ridges in the upper surface of the article being formed. This first stage, permitting the escape of entrapped air, may take, for example, 0.5 to 5 seconds.

At the end of the initial period, a high pressure of, for example, from about 80 to 500 p.s.i.g., is introduced while the press is still in a downward position. During this portion of the operating cycle, the lamination package is further compressed and under the heat and compression provided the vinyl sponge softens at the interface of the sponge substrate and covering film and the upper surface of the sponge substrate collapses and bonds in entirety to the film.

Continued softening and higher pressure forces the sponge and overlay material into the grooves provided in the die making them conform to the shape of the die and molding a positive relief pattern into the surface of the article.

After the package has been thermally heated for an adequate period of time depending on the density of the sponge and the thickness of the materials, and for a time, for example, of about 5 to 25 seconds, a high frequency generator is actuated and a dielectric heat or energy is applied to the package. The final laminating of the sponge to the overlay and the molding of the relief is completed and the borders or shoulders surrounding the article are formed into the shape of a compound curve. This result can only be achieved as a result of the shape of the die and a controlling of the ratio of the two types of heat or energy which are applied to the die and to the article being formed. Preferably, the edge is given a profile such as to turn under or below the lower surface of the article being formed.

The thermal power (i.e., that power supplied into the die by means of conduction) may range from about 2 to 200 kilowatts, whereas the high frequency power may range from about 2 to 200 kilowatts with an operating frequency of from about 5 to 300 megacycles.

During the part of the cycle in which the high frequency is applied the peripheral edges of the article are fused and softened and are substantially cut through by the steel knife edges constituting the edge of the die.

When the high frequency power cycle is completed, the position of the press is maintained to allow an additional dwell of thermal heat to be applied to the article. The application of the so-called thermal heat at this particular phase of the press cycle finalizes the contour of the border or edge of the article and simultaneously assures that the edge turns downwardly to form a slight lip which extends below the horizontal plane of the bottom of the article. This is a unique feature which provides safety and improves the appearance of the article of manufacture of the invention.

Upon completion of the last described cycle, the press is raised and the operation is completed. The article can then be removed from the press to prepare for the formation of the next article of manufacture. To facilitate the removal of the article and eliminate any possibility of sticking all of the die surfaces that come into contact with the vinyl film or foam are coated with a fluorocarbon resin such as tetrafluoroethylene.

The completed article is completely fused and laminated over its entire area at the interface of the overlay and substrate. This technique of combining the so-called thermal and high frequency heating results in a complete fusion at the interface of the overlay and substrate and a molding of a relief pattern into the top surface of the article without fusing or collapsing the cellular structure of the balance of the sponge which is not in the immediate vicinity of the abutting faces. Preferably the sponge should not be collapsed any further than a distance of 2 millimeters from the film overlay. As a result, the laminate retains almost in entirety its full thickness and original resilience as well as impermeability to moisture, food odors, contaminants and so forth. The resulting article has a permanent relief pattern formed in its surface which provides a slip-proof safety feature and it is decorative as well.

For purposes of the manufacture of floor mats, fatigue mats, and the like, the unique contour of the border and with its turned-down edge or lip provides for hugging a supporting surface thereby offering the additional feature of safety due to the non-skid quality of the floor mat as well as the avoidance of tripping as would occur with a raised or square-shaped edge.

FIGS. 1–3 illustrate a floor mat manufactured in accordance with the techniques of the invention. More particularly, the floor mat of the invention comprises a body 10 formed of a sponge substrate 12 having an overlay of film 14 covering the same. At the interface 16 the upper surface of the sponge substrate is collapsed due to the application of heat for purposes of bonding to the film overlay. As has been noted above, the film may be of vinyl and the cellular substrate may similarly be a vinyl sponge or foam.

On the upper surface of the mat are provided intersecting ridges. One group of ridges 18 is angularly related to the other group of ridges 20. In the illustrated embodiment these ridges run perpendicularly to one another, but other angular relations and ridge shapes are also possible. These ridges provide for a surface decoration and moreover provide for a non-skid surface.

At 22 is indicated the peripheral edge of the mat. The profile of the edge is such that it turns down below the bottom planar surface 24 of the mat thus providing for a floor hugging, non-tripping, non-skid quality of the mat.

The apparatus for manufacturing the above mat appears in FIG. 4. More particularly, there is provided a base platen 30 on which is provided a buffer 32 atop which rests a pressure pad 34 of the above noted type. A sponge elastomer 36 is placed on top of the pressure pad 34 and a thermoplastic film 38 is superposed on the sponge elastomer. The sponge and film may be of the type noted hereinabove.

A forming die 40 is superposed with respect to the base platen 30. A mounting platen 42 located above the forming die 40 supports the latter. In the mounting platen 42 is provided a heating coil 44 such as the electrical resistance type. Terminals 46 and 48 provide for connecting the heating coil to a suitable source of electrical power.

A press platen 50 is positioned above mounting platen 42 to which it is connected through the intermediary of an asbestos layer 52. The press platen is operated by one or more hydraulic or pneumatic cylinders 54, 56 and 58, these being in turn connected to and operated by suitable pressure sources controlled by a low pressure solenoid 60 and a high pressure solenoid 62, these in turn being coupled to and operated by a series of timers 64, 66, 68 and 70.

It will be noted that the peripheral edges 72 and 74 extend beyond the outer borders of the pressure pad 34. This enables the effecting of a severing and forming operation of the type to be discussed in greater detail hereinafter.

More particularly, the low pressure solenoid 60 enables the passage of a low pressure medium to cylinders 54, 56 and 58 so that the die 40 can be brought down upon the laminate package and maintained against the same at a relatively low pressure of, for example, 5 to 50 p.s.i.g. for a period of about 0.5 to 5 seconds.

During this period, the escape of entrapped air is effected as from between the sponge substrate 36 and the film overlay 38. This is furthermore effected as a result of the grooves provided in the forming die as will be hereinafter described. It should be noted that if the die is brought against the laminate package under an immediately higher pressure, air will be entrapped between the film overlay and the sponge substrate and the complete bonding between these two elements will not be achieved and an inferior product will result.

The timer 64 maintains the first stage of the operation for the above specified time, whereafter timer 66 causes the second stage to be embarked upon, namely the application of high pressure to cylinders 54, 56 and 58 by operation of high pressure solenoid 62. This brings about the second stage wherein a pressure of from about 80 to 500 p.s.i.g. is applied to the laminate package according to the characteristics of the materials employed.

As has been discussed above, the application of the heated die to the laminate package initiates the melting or collapsing of the upper surface of the sponge substrate thereby initiating the bonding operation as between the film overlay and the sponge substrate.

Reference is now made to the high frequency generator 80 which is of a commercially available type capable of supplying a power of, for example, from about 2 to 200 kilowatts at a frequency of about 5 to 300 megacycles. Stage 3 of the operation brings the high frequency generator into play and a high frequency electromagnetic energy is applied between the forming die and the base platen. As has been noted above, this completes the fusing operation as between the film overlay and sponge substrate and as well initiates a severing of the article of manufacture from the overall film and sponge layers. At this stage, there is applied to the article of manufacture a combination of the so-called thermal heat (i.e., the heat generated by coil 44) and high frequency or dielectric heat, the latter being controlled by the timer 66 as well as adjustments normally available therein. This completes the final laminating of the sponge and overlay and the molding of the relief pattern. At the same time the peripheral edge with its accompanying borders or shoulders are hot formed into the article and the peripheral edge is provided with a compound curve constituting the profile thereof. This result can be achieved only as a result of the shape of the die and a controlling of the relationship of the thermal heat with respect to the high frequency power applied. Thus, it is a control of the ratio of the thermal heat to the dielectric or high frequency heat which controls and determines the final shape of the peripheral edge.

FIG. 5 illustrates in perspective view the forming die 40 in inverted attitude with the lower surfaces thereof exposed. In FIG. 5 can be seen the peripheral knife edges 90, 92, 94, and 96 which are brought to bear against the laminate package for purposes of pinching the same and initiating the severing of the article of manufacture from the overall film and substrate layers. The knife edges 90, 92, 94 and 96 moreover provide for a focusing of the high frequency energy to the edge portions of the article of manufacture.

In the surface 98 of the die are provided intersecting grooves or channels 100 and 102, these being the grooves or channels which provide for the surface decoration effect in the finalized article of manufacture. These grooves moreover provide for the escape of entrapped air from between the film overlay and sponge substrate and are accordingly an important feature of the invention.

A section through the die 40 appears in FIG. 6 wherein are seen, for example, knife edges 90 and 94. It will be seen herein that the die is provided with a brass border shaper section 110 and that the laminating and molding plate 112 thereof is provided with grooves and channels 100 and 102 as aforesaid.

Figure 7:
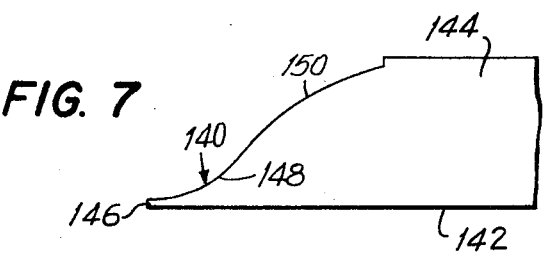
FIG. 7 illustrates an alternative edge shape which can be achieved in accordance with the invention.

While one shape of the peripheral edge of a floor mat has been illustrated and described hereinabove, other shapes are possible by controlling the relationship of the high frequency energy to the thermal heat. Thus, for example, FIG. 7 shows the shape of an edge 140 with the high frequency portion of the cycle reduced. Herein it is seen that the bottom plane 142 extends from the body 140 of the mat to the peripheral tip 146 thereof, the profile being a simple sinusoidal curve, the apices of which are indicated at 148 and 150.

Figure 8:
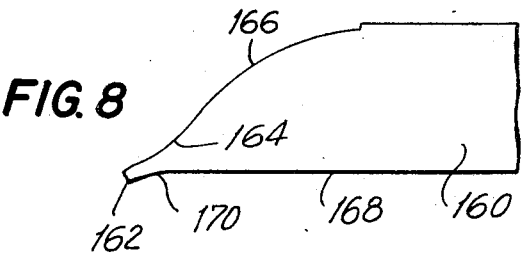
FIG. 8 shows another alternative edge shape for an article of manufacture provided in accordance with the invention.

FIG. 8 illustrates a similar body 160 provided with a down turned edge 162, this being the result of a decrease of high frequency energy with the use of more thermal energy. Herein a sinusoidal profile is also provided, the apices of which are indicated at 164 and 166, there being a departure from the bottom plane surface 168 of the body as illustrated at 170 whereat the peripheral edge of the body extends to a lower degree.

Figure 9:
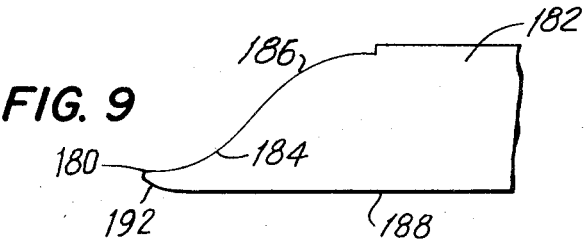
FIG. 9 shows still a further edge shape or profile which can be provided in accordance with the invention.

FIG. 9 illustrates still a further form of edge which can be achieved in accordance with the invention although this edge is believed to be less desirable for floor mats than those described hereinabove. In FIG. 9 the edge 180 of body 182 is directed upwardly, there being a sine curve profile, the apices of which are indicated at 184 and 186. In this embodiment of the invention, the bottom horizontal planar surface is indicated at 188 and at point 190, the profile swings upwardly as indicated at 192.

In the above description, as well as in the claims which follow hereinafter, the terms "sponge" and "foam" may be interchangeably used, but are preferably intended to indicate a closed cell structure having a relatively high degree of resilience.

The amount of thermal heat power as well as the amount of high-frequency power required for the manufacture of the above type of article from a particular elastomer will vary somewhat according to the size and area of the die and the density of the sponge. However, by way of example, the range of ratios of thermal heat to high-frequency heat which will ordinarily suffice will be from 1:1 to 30:1 within which a preferred range is from 2:1 to 10:1.

An economy version of the fatigue mat type of product can be made on the described equipment, using substantially the same technique, but utilizing the sponge or foam vinyl alone, i.e., without the overlaid film lamination. In this instance, the foam will have ridges molded into its surface, the border of the mat will be shaped, the edges around the perimeter will be turned down and the article will be cut to shape and size. In the manufacture of the above variation of the article, a lower thermal heat (e.g. 250°–325° F.) may be found to be more suitable.

What is claimed is:

1. In a method comprising heating a die by means of thermal conduction energy, bringing the thusly heated die against a thermoplastic cellular layer on a base platen to form a wedge shaped peripheral edge for the layer, and applying a high frequency electromagnetic energy to the layer to assist in forming said peripheral edge, the improvement comprising controlling the shape of the profile of said edge by varying the ratio of the thermal conduction and high frequency energies, and applying the thermal energy before, during and after the high frequency energy to heat and shape said peripheral edge and compress the cellular layer thereat, said thermal conduction energy to high frequency energy being in a ratio of about 1:1 to 30:1.

2. A method as claimed in claim 1 comprising covering said layer with a thermoplastic film prior to moving the die thereagainst to form a film-sponge article and providing the die with grooves to form ridges on said article and bringing the die against the film in at least two successive stages of relatively low and high pressure to evacuate air from between said film and layer, said thermal and high frequency energy cooperatively laminating the film and layer over substantially the entire facing surfaces thereof.

3. A method as claimed in claim 2, wherein the film has a higher melting point than said layer, comprising melting the layer to no more than a depth of about two millimeters, adjacent said film to bond to the latter.

4. A method as claimed in claim 3 comprising decreasing the high frequency energy relative to the thermal energy to turn down said peripheral edge.

5. A method as claimed in claim 2, wherein the first of said stages is from 5 to 50 p.s.i.g. and lasts for periods of about 0.5 to 5 seconds and wherein the next stage is at a pressure of from about 80 to 500 p.s.i.g.

6. A method as claimed in claim 2, wherein the cellular layer is vinyl sponge having a density of 3–45 lbs. per cubic foot and having cells of from about .01 to 3 millimeters in size and wherein the power to generate the thermal conduction energy is from about 2 to 200 kilowatts whereas the power to generate the high frequency energy is about 2 to 200 kilowatts with a frequency of about 5 to 300 megacycles.

References Cited

UNITED STATES PATENTS

| 3,026,233 | 3/1962 | Scholl et al. | 156—251 |
| 3,244,571 | 4/1966 | Weisman | 156—273 X |
| 2,991,216 | 7/1961 | Ming C. Hsu et al. | 156—273 X |
| 2,702,769 | 2/1955 | Alderfer | 161—118 |
| 3,520,754 | 7/1970 | Scholl et al. | 156—273 |
| 3,520,755 | 7/1970 | Scholl et al. | 156—273 X |

WILLIAM A. POWELL, Primary Examiner

U.S. Cl. X.R.

156—87, 251, 267, 273, 380, 515; 161—118, 119, 121, 123, 149; 264—161, 163, 241, 293, 294